6788X
E. N. Sherr,
Guitar,
Patented Oct. 6, 1831.
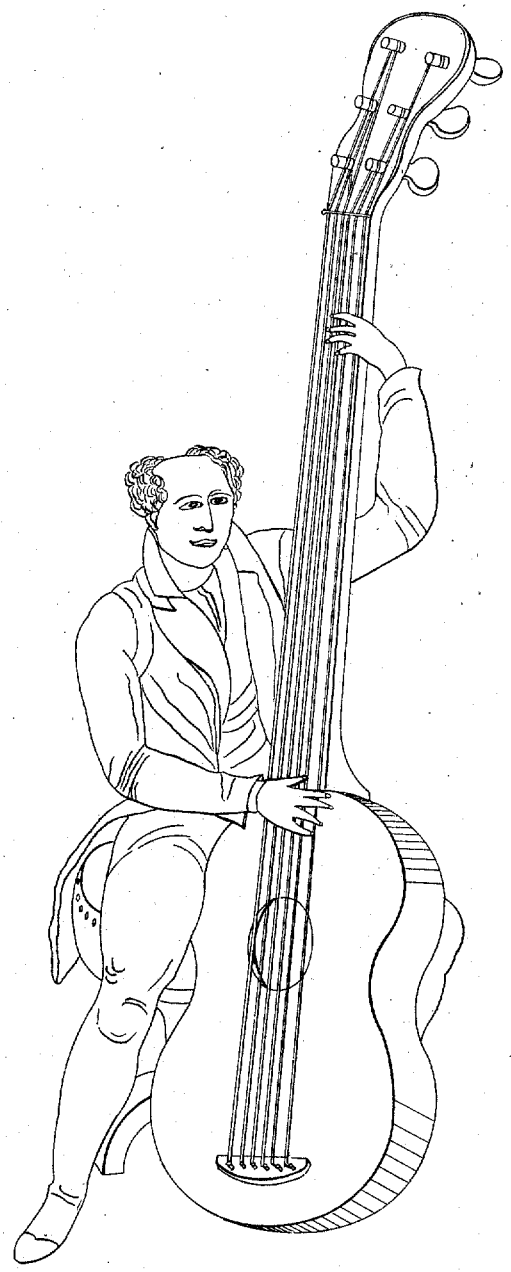
AM. PHOTO-LITHO. CO. N.Y. (OSBORNE'S PROCESS)

[illegible] 11

Oct. 6. 1831 171

C. N. Sherr, Philadelphia Pa.

6788X

Letters Patent.

The Schedule referred to in these Letters Patent, and making part of the same, containing a description in the words of the said C. N. Sherr, himself of his improvement in the musical instrument called the Guitar.

To all whom these presents may concern. —
Be it known that I, C. N. Sherr of the City of Philadelphia have invented a new and useful improvement in the musical instrument called the guitar. The instrument improved by me is called the Harp Guitar; all guitars heretofore used, have been used either whilst held in the hands of the player, or on his or her lap; the harp guitar is in length, four feet ten inches, longer than the common guitar by about one foot & a half; it is not played when held in the hands or on the lap, of the performer, but rests on the floor and is played Just as a harp is. The shape of the harp guitar may be varied to suit the taste of the owner or the player; that shape used by your petitioner, is [illegible] described in a sketch already transmitted to the patent office, and will more at large appear by a lithographic representation now preparing in the wood, things [illegible] except as to the size and extent thereof. The Harp Guitar, and the common Guitar are similar. The improvement for which a patent is asked, is in the enlargement & adaptation of the instrument, whatever may be its shape, so that it may be played resting on the floor, combining the Characteristics of the Guitar and Harp; so that in reality, the improvement is, that the Harp Guitar is played resting on the floor,

[illegible]

72. 6788X

The advantages of this improvement are great and readily perceived by any one acquainted with either Harp or Guitar.

Witnesses

W. J. Duane — C. A. Hurst

G. Bartram 352 wb